United States Patent [19]
Komatsu et al.

[11] Patent Number: 5,311,737
[45] Date of Patent: May 17, 1994

[54] EXHAUST PURIFICATION APPARATUS FOR AN ENGINE

[75] Inventors: Kazunari Komatsu; Kiyoshi Kuronishi; Naoyuki Noguchi; Hirofumi Nishimura, all of Hiroshima, Japan

[73] Assignee: Mazda Motor Corporation, Hiroshima, Japan

[21] Appl. No.: 959,762

[22] Filed: Mar. 30, 1992

[30] Foreign Application Priority Data

Mar. 29, 1991 [JP] Japan ................................. 3-093517
Mar. 29, 1991 [JP] Japan ................................. 3-0933518
Jul. 16, 1991 [JP] Japan ................................. 3-202597

[51] Int. Cl.$^5$ ............................................. F01N 3/28
[52] U.S. Cl. ............................... 60/276; 60/277; 60/285; 123/674; 123/688; 123/691
[58] Field of Search ..................... 60/276, 277, 285; 123/688, 691, 674

[56] References Cited

U.S. PATENT DOCUMENTS 4,622,809  11/1986  Abthoff ................................. 60/276
4,796,425  1/1989  Nagai ................................. 123/691

Primary Examiner—Douglas Hart
Attorney, Agent, or Firm—Keck, Mahin & Cate

[57] ABSTRACT

An exhaust purification apparatus for an engine uses a catalytic converter provided in an exhaust system of the engine. First and second exhaust sensors are provided on upstream and downstream sides, respectively, of the catalyst converter in the exhaust system. Detected values from the first and second exhaust sensors are used for feed back control of air fuel ratio and judging deterioration of the catalyst of the catalytic converter, respectively. A control constant of the air fuel ratio of the feed back control is changed so that the second exhaust sensor detects in accordance with a condition of the catalyst.

9 Claims, 10 Drawing Sheets

EXHAUST PURIFICATION APPARATUS FOR AN ENGINE

BACKGROUND OF THE INVENTION

1. Field of the Invention

This invention relates to an exhaust purification apparatus for an engine and, more particularly, to an exhaust purification apparatus for an engine in which a catalytic converter for reducing noxious ingredients included in exhaust gas by catalysis is located in an exhaust passage on a downstream side of the engine combustion chambers, and in which the air fuel ratio of mixture supplied to the combustion chambers is controlled, by feedback, towards a target air fuel ratio in response to a detected value of an exhaust sensor disposed on an upstream side of the converter for detecting concentration of remaining oxygen in the exhaust gas.

2. Description of the Related Art

There is known for an engine for a vehicle or the like, a catalytic converter which, in order to reduce noxious ingredients included in exhaust gas, uses a three element catalyst for the purification of three ingredients, namely carbon monoxide (CO), hydrocarbon (HC), and nitrogen oxide (NOx). The converter is located in an exhaust system in which air fuel ratio control is performed so as to keep the air fuel ratio of the mixture supplied to the combustion chambers to a predetermined target air fuel ratio (for example the theoretic air fuel ratio; air/fuel = 14.7) so that the catalysis of the three element catalyst is effectively obtained. More specifically, the air fuel ratio control is performed by an exhaust sensor, in which an output condition is changed with respect to a condition that air surplus ratio LAMBDA (actual air fuel ratio/theoretic air fuel ratio) is equal to 1, as a border, on an upstream side of the converter, and either decreasing fuel supply volume when a detected value of the exhaust sensor indicates a state of oxygen shortage (a state wherein, for example, fuel is in surplus against air; hereinafter, called a rich state) or increasing fuel supply volume when the detected value indicates an oxygen surplus state (a state wherein, for example, fuel is thin against air; hereinafter, called a lean state), so that the air fuel ratio of mixture supplied to the combustion chambers converges towards the target air fuel ratio.

The three element catalyst used for the catalytic converter may cause a problem in that deterioration of performance occurs over a period of time, because of attachment of impurities to the catalyst ingredients from, for example, leaded gasoline.

To overcome such a problem, there has been proposed an exhaust purification apparatus, in which a second exhaust sensor for detecting oxygen concentration is disposed on a downstream side of the catalytic converter, and in which deterioration of catalysis is judged by inverting the output of the exhaust sensor at the time of feedback control of air fuel ratio, see for example, Japanese Unexamined Patent Publication No. 63-97,852. In this apparatus, deterioration of the catalyst is indirectly judged, by providing that no difference of concentration of oxygen is produced between the downstream side of the catalyst and the upstream side, due to a decline of performance of oxygen storage at the time of deterioration of the catalyst.

Meanwhile, since the catalyst in the catalytic converter performs to repeat oxidation-deoxidation reactions against the noxious ingredients by absorbing and dissociating of oxygen, problems may occur in that a partial pressure of oxygen on the downstream side of the catalytic converter is not prone to change and that it is not defined in either the oxygen surplus state or the oxygen shortage state related to a driving condition. Namely, since the mixture supplied to the combustion chambers of the engine is controlled to within the vicinity of the theoretic air fuel ratio, oxygen concentration in the exhaust gas exhausted from the combustion chamber becomes a value reflected in the theoretic air fuel ratio. Therefore, if oxygen quantity in the exhaust gas on the upstream side of the catalytic converter is high, oxygen on the downstream side of the converter is in a surplus state by oxygen overflown from performance of oxygen storage of the catalyst. Alternatively, if oxygen quantity in the exhaust gas is low, since all oxygen is absorbed in the catalyst, oxygen on the downstream side is in a shortage state. Consequently, in the case that deterioration judgement of the catalyst is performed on the basis of a detected value of the exhaust sensor on the downstream side of the converter, a problem occurs in that an adequate judgement accuracy is not obtained.

Against such problems, although it is thought that control constant of the feedback control should be changed so that a partial pressure of oxygen on the downstream side of the catalytic converter around the exhaust sensor is shifted to either the oxygen surplus state (the lean state) or the oxygen shortage state (the rich state) during detecting deterioration of the catalyst, a new problem may occur in that the control constant is not easily determined due to difference of system structures of engines, disunity of output characters of exhaust sensors, change in a long time and so on. Namely, even if the control constant is set so that, for example, the exhaust state during detecting deterioration shifts to the lean state, if it is shifted to a state which is too lean, reliable detecting sensitivity is not obtained because the output of the exhaust sensor does not tend to invert to the rich state, and if it is not shifted, accuracy of the judgement is not improved.

Moreover, since the catalyst of the catalytic converter in an initial period of use has an excellent performance of oxygen storage in particular, another problem may occur in that variation of oxygen concentration on the downstream side of the catalytic converter is small by an ordinary air fuel ratio feedback control and so that a result of detection of the exhaust sensor does not reflect an active state of the catalyst.

Furthermore, the exhaust sensor used for detecting deterioration of the catalyst is itself deteriorated during a long period of use. Even if a control constant of feed back control for detecting deterioration of the catalyst set at an initial period is used, by a decline of character of reaction of oxygen of the exhaust sensor, even if activation of the catalyst is high enough, a misjudgment that the catalyst is in a deteriorated state may occur.

SUMMARY OF THE INVENTION

It is one object of the present invention to provide an exhaust purification apparatus having means for providing an improved judgement accuracy of catalyst deterioration without loss of accuracy of air fuel ratio control.

It is another object of the present invention to provide an exhaust purification apparatus, in which exhaust purification performance is secured during an ordinary state and a judgement accuracy of the deterioration of the catalyst is improved.

The foregoing objects are accomplished, according to the present invention, by providing an exhaust purification apparatus, in which a first exhaust sensor for air fuel feedback control is disposed on an upstream side of a catalytic converter, and in which a second exhaust sensor for judging deterioration of the catalyst is disposed on a downstream side of the converter. Control constant changing means is provided for changing a control constant of the air fuel ratio of the feed back control so that the second exhaust sensor means detects concentration of remaining oxygen in accordance with the condition, of the catalyst in the catalytic converter.

In accordance with one embodiment of the invention, a suitable control constant for shifting oxygen partial pressure while detecting deterioration of the catalyst is selected through a balanced condition, or a condition that oxygen surplus and shortage states are equally repeated alternatively, as a learning procedure, during a normal operating state of the apparatus.

In accordance with another embodiment of the present invention, the control constant changing means changes the control constant for shifting oxygen partial pressure to either an oxygen surplus or shortage state while detecting deterioration of the catalyst so that the second exhaust sensor detects with high sensitivity. In order to reflect the condition of the catalyst of the catalytic converter, used time related information is used for selecting the control constant. Moreover, by selecting a control constant of the timing right before the output of the second exhaust sensor is inverted, an accurate detection is performed, even if the second exhaust sensor has deteriorated.

BRIEF DESCRIPTION OF THE DRAWINGS

The above and other objects and features of the present invention will be apparent to those skilled in the art from the following description of preferred embodiments thereof when considered in conjunction with the drawings, in which.

DESCRIPTION OF THE PREFERRED EMBODIMENTS

Figure 1:
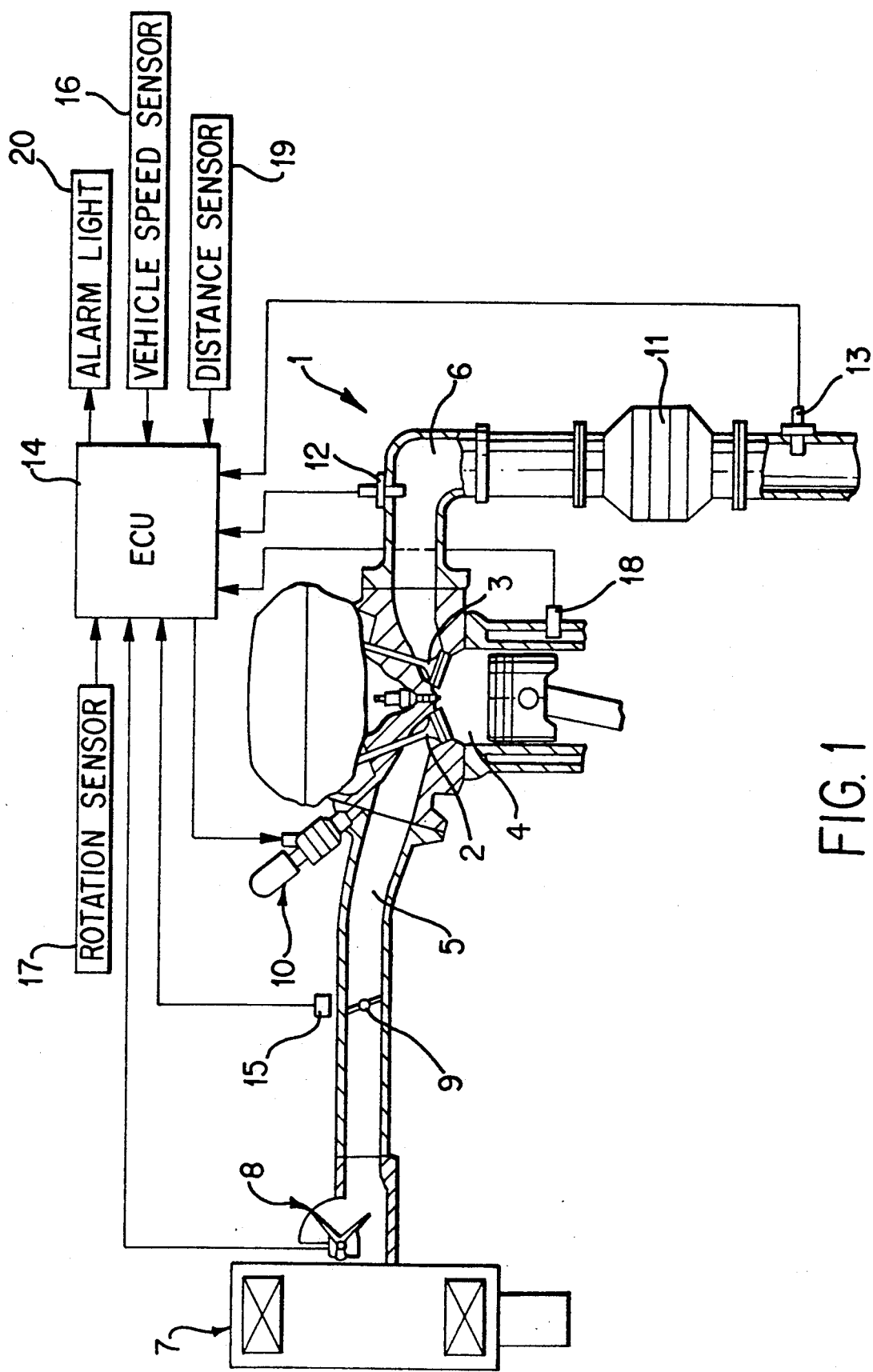
FIG. 1 is a schematic illustration of an engine and an exhaust purification apparatus applied to the engine according to a preferred embodiment of the present invention.

Referring to FIG. 1, a control system of an engine 1 is shown. In the engine 1, there are air intake passage 5 and an exhaust passage 6, which are connected to a combustion chamber 4 through an intake valve 2 and an exhaust valve 3, respectively. In the intake passage 5, an air cleaner 7, an air flow meter 8, and a throttle valve 9 are provided on the upstream side, and a fuel injection valve 10 is provided on the downstream side of the throttle valve 9.

A three element catalyst type catalytic converter 11 for purifying exhaust gas after combustion is disposed in the exhaust passage 6. First and second exhaust sensors 12, 13 for detecting concentration of remaining oxygen in the exhaust gas are disposed on the upstream and downstream sides of the converter 11, respectively.

The control system is equipped with an electronic control type control unit (hereinafter, called an ECU) 14 in which controlling of the volume of fuel injection from the fuel injection valve 10 and judging of deterioration of the catalyst converter 11 are performed. The ECU 14 is inputted with an intake air volume signal from the air flow meter 8, a throttle open degree signal from a throttle sensor 15 for detecting the open degree of the throttle valve 9, a vehicle speed signal from a vehicle speed sensor 16 for detecting the speed of the vehicle, an engine speed signal from a speed sensor 17 for detecting engine speed, a water temperature signal from a water temperature sensor 18 for detecting the temperature of engine cooling water, oxygen concentration signals detected by the first and second exhaust sensors 12, 13, and a running distance signal from a distance sensor 19 for detecting the running distance of the vehicle. The ECU performs air fuel ratio control of the mixture supplied to the combustion chamber 4 and a process of judgement of deterioration of the catalytic converter, on the basis of these signals. Moreover, ECU 14 performs control of an alarm light 20 for providing an alarm of deterioration of the catalytic converter 11.

A summary of the air fuel ratio control which the ECU 14 performs will now be given. After reading the input signals, the ECU 14 controls air volume delivered to the combustion chamber 4 per cycle on the basis of the intake air volume indicated by the intake air volume signal and the engine speed indicated by the engine speed signal, and sets a fundamental fuel injection volume corresponding to it. Next, the ECU 14 judges whether a feed back condition of the air fuel ratio is complete or not. Namely, the ECU 14 judges that the feed back condition is complete, for example, when the driving condition, in which the open degree of the throttle representing the load of the engine and the engine speed are used as parameters, of the engine 1 belongs to a predetermined feed back region and when the cooling water temperature of the engine indicated by the water temperature signal is greater than a predetermined value, and then the ECU executes the air fuel ratio feed back control.

The air fuel ratio feed back control is executed approximately by the following steps. Namely, if the oxygen concentration signal from the first exhaust sensor 12 indicates a lean state of the air fuel ratio, the ECU 14 sets feed back correction value $C_{FB}$ so as to increase fuel delivery. On the other hand, if the oxygen concentration signal indicates a rich state of the air fuel ratio, the ECU 14 sets the feed back correction value $C_{FB}$ so as to decrease fuel delivery. Moreover, a final injection value is decided by collecting the fundamental injection value using the feed back correction value $C_{FB}$ and a water correction value. Then, the fuel injection signal is outputted to the fuel injection valve 10 so that the final injection value is obtained.

Moreover, the feed back correction value $C_{FB}$ is calculated by the following steps in detail. Namely, as shown in FIG. 2(a), the ECU 14 judges that the air fuel ratio is inverted from the lean state to the rich state at the time that the output voltage V of the first exhaust sensor 12 becomes greater than a predetermined standard voltage $V_1$. The ECU 14 continues to renew the value of the feed back correction value $C_{FB}$ of the present timing during a period of a lean delay constant $D_{L1}$ using a rich integral constant $I_{R1}$. After passing the lean delay constant $D_{L1}$, the value of the feed back correction value $C_{FB}$ is suddenly dropped by a lean skip value $P_{L1}$, and then, is gradually reduced using a lean integral constant $I_{L1}$. The ECU 14 judges that air fuel ratio is inverted from the rich state to the lean state at the time that the output voltage V of the first exhaust sensor 12 becomes less than the predetermined standard voltage $V_1$. The ECU 14 continues to renew the value of the reed back correction value $C_{FB}$ of the timing during a period of a rich delay constant $D_{R1}$ using a lean integral constant $I_{L1}$. After passing the rich delay constant $D_{R1}$, the value of the feed back correction value $C_{FB}$ is suddenly increased by a rich skip value $P_{R1}$, and then, is gradually increased using a rich integral constant $I_{R1}$.

Furthermore, The ECU 14 continuously inspects the output voltage V of the second exhaust sensor 13, and corrects, respectively, the skip values $P_{L1}$, $P_{R1}$, the integral constants $I_{L1}$, $I_{R1}$, and the delay constants $D_{L1}$, $D_{R1}$ by a learning procedure so that a retaining time of the oxygen shortage state which the output voltage V is greater than the standard voltage $V_2$ (hereinafter called a lean time) and a retaining time of the oxygen surplus state which the output voltage V is less than the standard voltage $V_2$ (hereinafter called a rich time) are set at 1 to 1.

If the ECU judges that the feed back condition is incomplete, the ECU executes an open loop control for outputting a fuel injection signal to the fuel injection valve 10 so that the fuel injection volume is equivalent to one read out from a fuel injection map set by the open degree of the throttle, the engine speed, the water temperature and so forth, as parameters.

Figure 3:
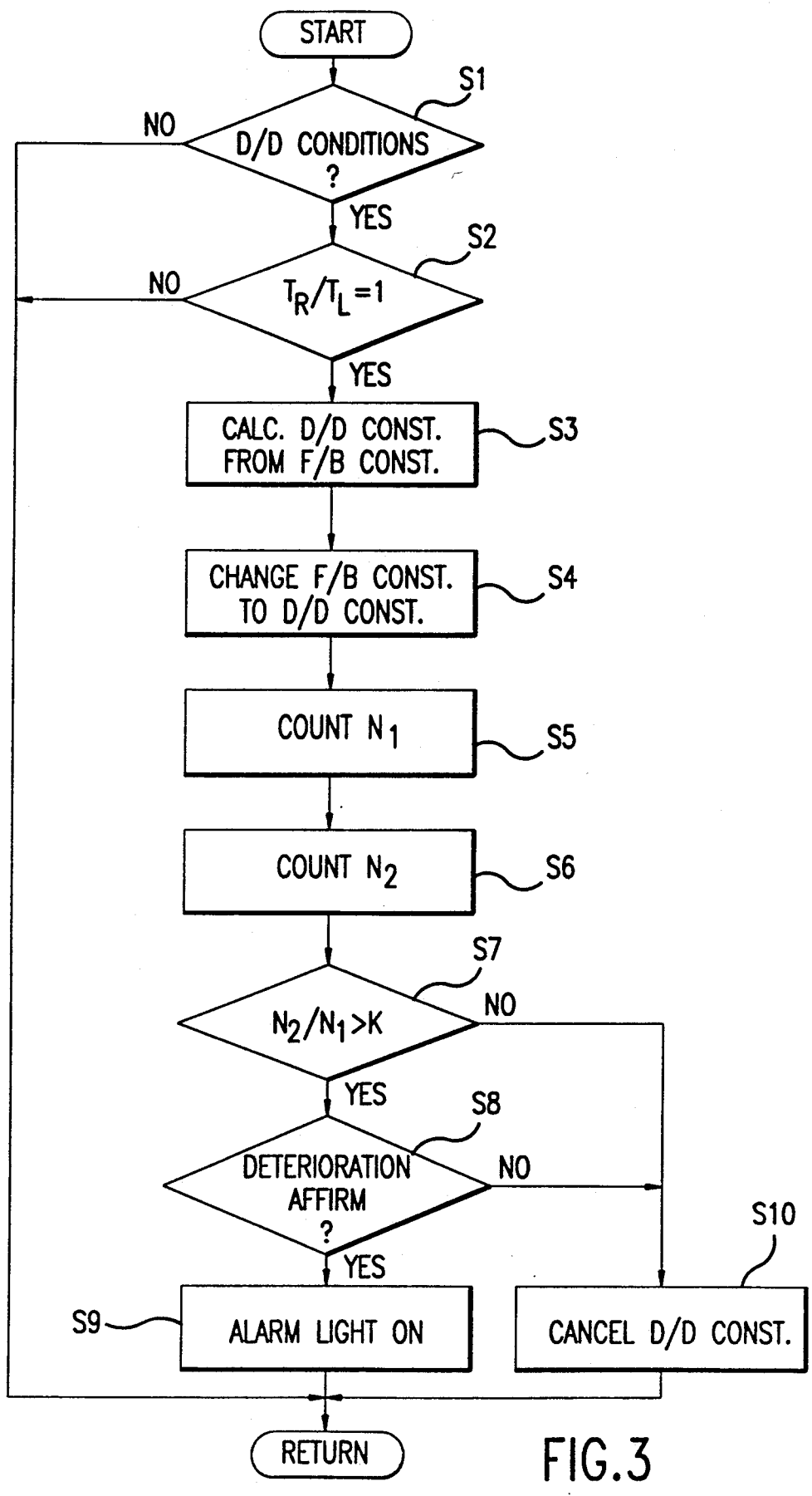
FIG. 3 is a flow chart showing a process for detection of deterioration of the catalyst.

Next, a process for the detection of catalyst deterioration, which is a characteristic feature of the invention, will be explained using the flow chart in FIG. 3.

The ECU 14 judges whether a predetermined catalyst deterioration detect condition is complete or not. That is, the ECU 14 judges that the catalyst deterioration detect condition is complete, only when the air fuel ratio feed back condition is complete and that the open degree of the throttle, the vehicle speed and so forth are satisfied with predetermined conditions.

Figure 2:
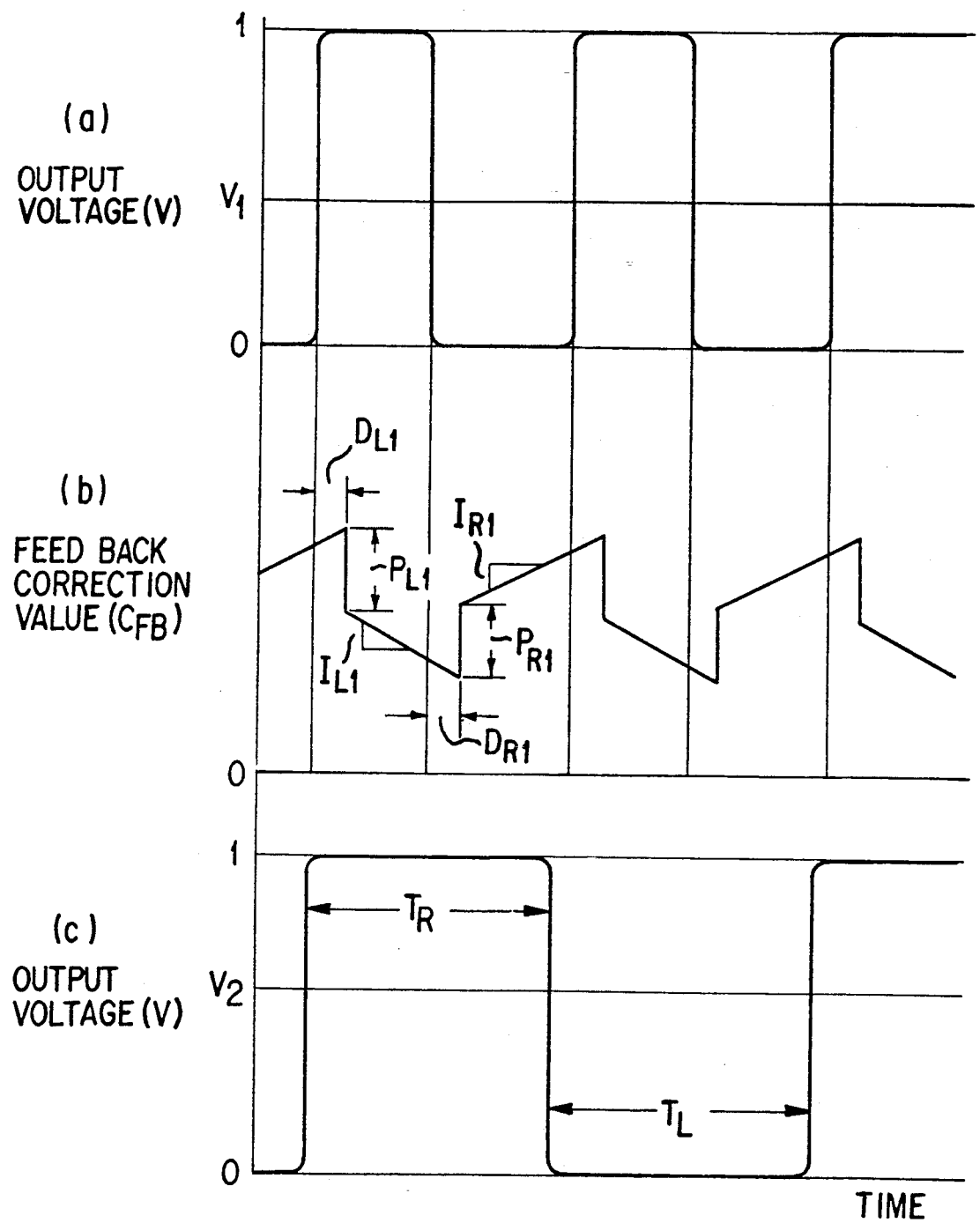
FIG. 2 is a time chart showing change of a feed back collection value during a normal operating state.

Next, if the ECU judges that the catalyst deterioration detect condition is complete, going to step S2, the ECU 14 judges whether the rich time $T_R$ and the lean time $T_L$ are each identified or not, and if YES is judged, the ECU 14 calculates control constant for detecting deterioration of the catalyst from the feed back constant at the present time at step S3. In other words, as shown in FIG. 2, while paying attention to skip values, if the integral constants and the delay constants are not changed, the feed back correction value $C_{FB}$ absolutely shifts to a fuel decreasing direction, only by, for example, making the lean skip value $P_{L1}$ slightly greater against the rich skip value $P_{R1}$, which are belonging to a timing that the rich time $T_R$ and the lean time $T_L$ are each identified. It is possible to set the rich skip value $P_{R1}$ relatively less against the lean skip value $P_{L1}$. Moreover, the same relation will be adapted to the integral constants and the delay constants. Accordingly, the control constant for detecting deterioration of the catalyst, by which the exhaust state around the second exhaust sensor 13 on the downstream side of the catalyst converter 11 is not rendered overly to an oxygen shortage state, is obtained.

Then, changing the feed back control constant to the control constant for detecting deterioration of the catalyst, the ECU 14 counts a first inverting number $N_1$ per a unit period indicated by the output voltage V of the first exhaust sensor 12, and a second inverting number $N_2$ per unit period indicated by the output voltage V of the second exhaust sensor 13 (steps S4 to S6). At step S7, a judgement is made whether a proportion of the second inverting number $N_2$ against the first inverting number $N_1$ is greater than a predetermined standard value of deterioration judgement K or not. If YES is judged, affirmation of whether there is deterioration of the catalyst is judged at a step S8, and if YES is judged, an alarm light 20 is turned on by executing the step S9. Moreover, the ECU 14 affirms the deterioration of the catalyst, for example, if the proportion of the second inverting number $N_2$ against the first inverting number $N_1$ is greater than the predetermined standard value of deterioration judgement K three times in series.

Moreover, if the ECU 14 judges NO at the step S7 or the step S8, moving to a step S10, the ECU 14 cancels the control constant for detecting deterioration of the catalyst which is changed at the step S4.

Next, operation of the embodiment will be explained.

Figure 4:
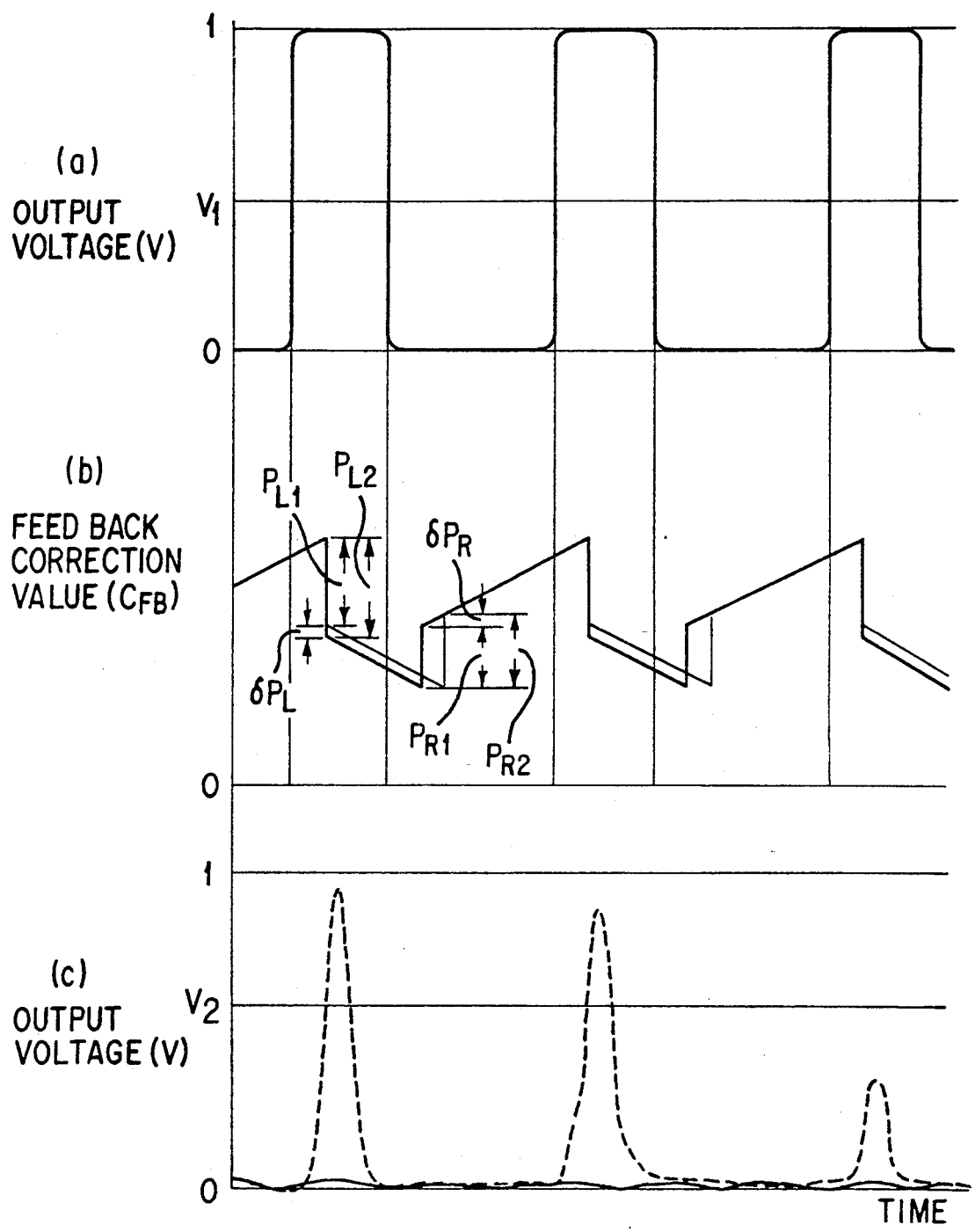
FIG. 4 is a time chart showing change of a feed back collection value during detection of deterioration of the catalyst.

During detection deterioration of the catalyst, for example, as shown in FIG. 4 (a), (b), the lean skip value $P_{L2}$ after the output voltage V of the first exhaust sensor 12 is inverted from the lean state to the rich state is changed to a greater value than the lean skip value $P_{L1}$ of the period of an ordinary state by $\delta P_L$ ($\delta P_L = P_{L2} - P_{L1}$), and the rich skip value $P_{R2}$ after the voltage V is inverted from the rich state to the lean state is changed to a lesser value than the rich skip value $P_{R1}$ of the period of an ordinary state by $\delta P_R$ ($\delta P_R = P_{R1} - P_{R2}$). Therefore, the air fuel ratio of the mixture supplied to the combustion chambers 4 shifts to the lean state, so that fuel tends to be in a shortage. As a result, the concentration of oxygen in the exhaust gas exhausted from the combustion chamber 4 is increased, so that an area around the second exhaust sensor 13 becomes in an oxygen surplus state by oxygen which is too much to store in the catalytic converter 11. Thus, in the oxygen surplus state, absorbing or dissociating of oxygen at the second exhaust sensor 13 is smoothly performed, so that the concentration of oxygen is detected with high sensitivity.

At that time, if the catalytic converter 11 is active, as shown in FIG. 4 (c), the output voltage V of the second exhaust sensor 13 keeps a state shifting to the lean side, and the proportion of the second inverting number $N_2$ against the first inverting number N is never greater than the predetermined standard value of deterioration judgement K, so that the deterioration judgement is not performed.

On the contrary, as shown in a broken line of FIG. 4 (c), if the output voltage V of the second exhaust sensor 13 tends to invert to the rich side exceeding the standard voltage $V_2$, the proportion of the second inverting number $N_2$ against the first inverting number $N_1$ tends to be greater than the predetermined standard value of deterioration judgement K. Therefore, if the deterioration of the catalyst is conclusively judged, the alarm 20 is turned on, and an extraordinary state is informed to the driver.

Figure 5:
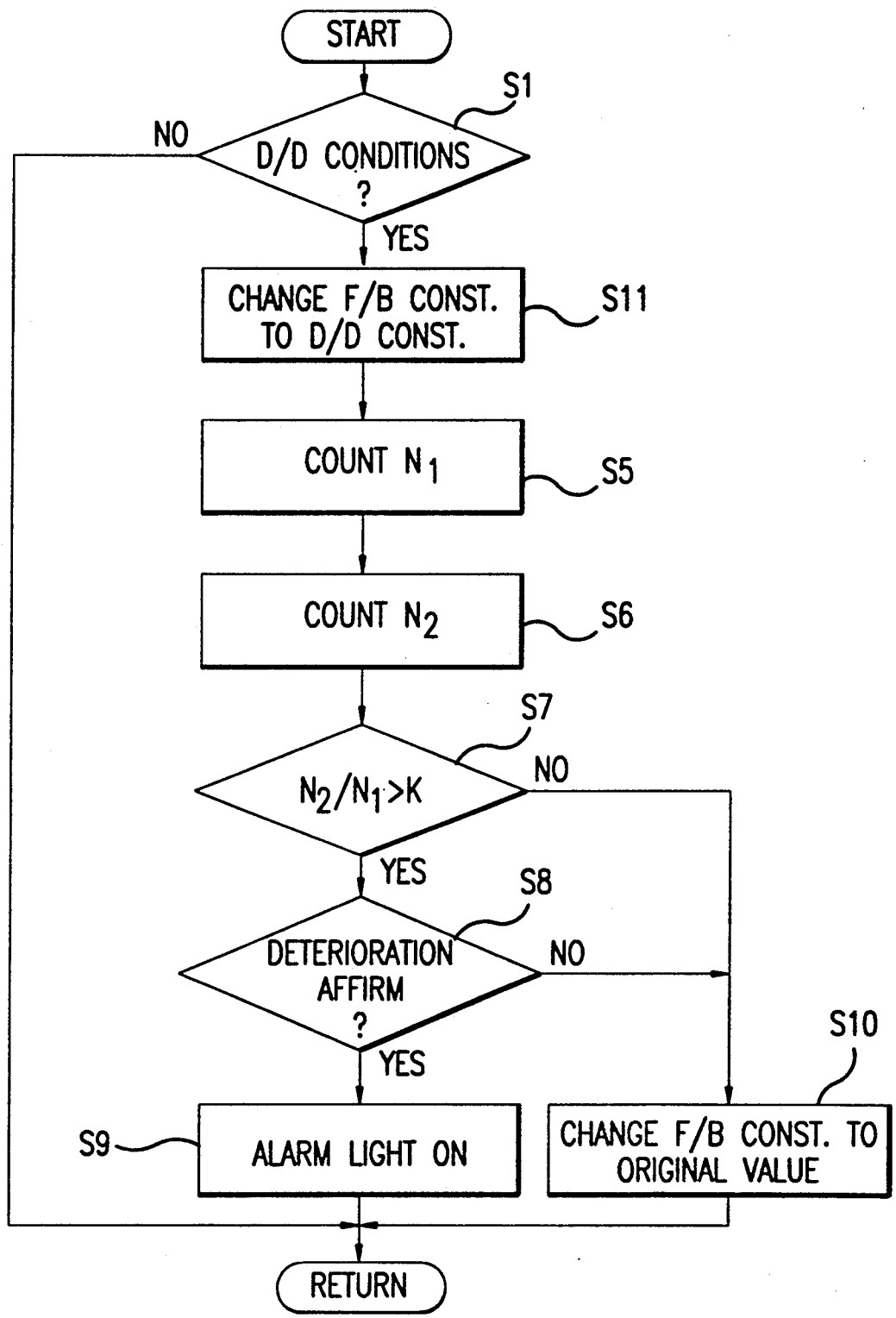
FIG. 5 is a flow chart showing a process for detection of deterioration of the catalyst according to another embodiment of the present invention.

Referring to FIG. 5, another process for detection of catalyst deterioration is shown as a flow chart. This process is similar to the process shown in FIG. 3, so that only the difference will be explained for the sake of the simplicity.

Figure 6:
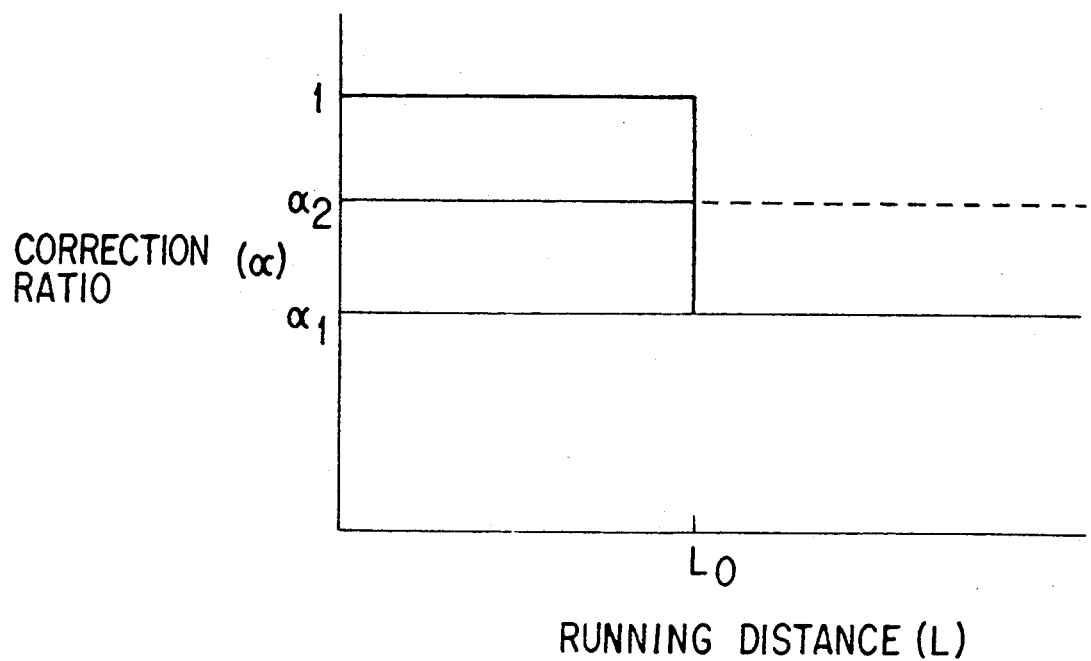
FIG. 6 is a flow chart showing an example of a collection ratio of a skip value against a running distance.

The difference of the flows is that a particular step S11 is added in lieu of the steps S2 to S4 mentioned above. At the step 11, a second lean skip value $P_{L2}$ which is greater than a first lean skip value $P_{L1}$ and a second rich skip value $P_{R2}$ which is greater than a first rich skip value $P_{R1}$ are respectively set as skip values for the feed back correction value $C_{FB}$. The second lean skip value $P_{L2}$ is set greater than the second rich skip value $P_{R2}$. Against both such skip values $P_{L2}$, $P_2$, a correction ratio $\alpha$ set from the running distance, which represents used time of the catalyst, is multiplied, so that final skip values are determined. Moreover, as shown in FIG. 6, the correction ratio $\alpha$ is set to a step shape in which value 1 is set if the running distance L has not yet reached a predetermined distance $L_0$ and in which a first correction value $\alpha_1$ which is less than 1 is set if the running distance L exceeds the predetermined distance $L_0$. Therefore, if the running distance L detected by the distance sensor 19 exceeds set distance $L_0$, the second lean skip value $P_{L2}$ and the second rich skip value $P_{R2}$ are suppressed in small amounts. Furthermore, if the second exhaust sensor 13 has deteriorated, a second correction value $\alpha_2$ which is shown as a broken line in FIG. 6 is selected. Namely, corrections of the second lean skip value $P_{L2}$ and the second rich skip value $P_{R2}$ are restricted. Moreover, a condition of deterioration of the second exhaust sensor 13 is judged, for example, on the basis of the inverting number during the feed back control of the air fuel ratio using the second exhaust sensor 13 in lieu of the first exhaust sensor 12.

Figure 7:
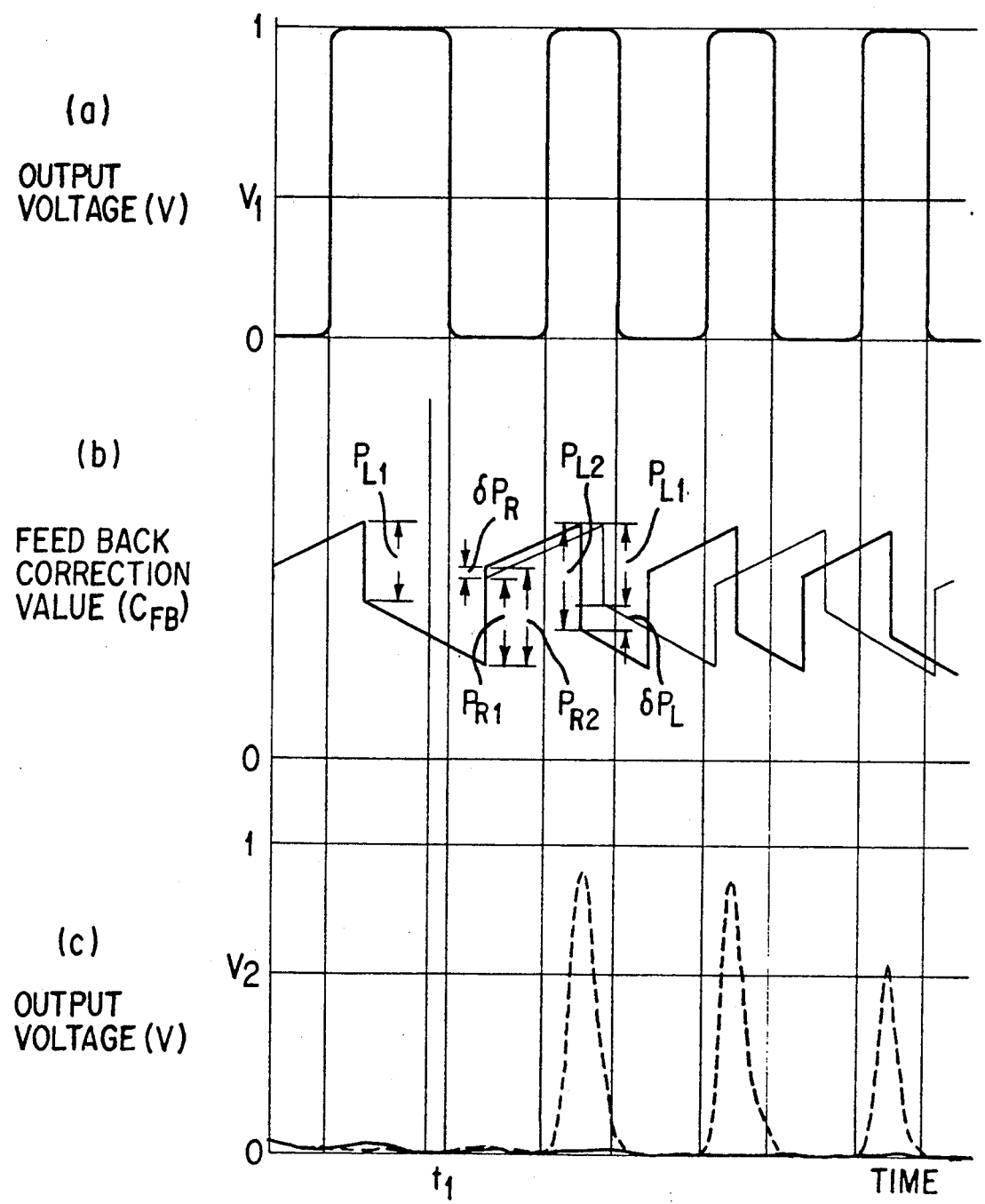
FIG. 7 is a time chart showing change of feed back collection value during a detection of deterioration of the catalyst according to another embodiment of the present invention.

In operation, if the predetermined catalyst deterioration detect condition is complete, after a time $t_1$, as shown in FIG. 7 (a), (b), a skip value of the feed back correction value $C_{FB}$ at a time that the output voltage V of the first exhaust sensor 12 is inverted from the lean state to the rich state is greater than that at a time that the output voltage V is judged from the rich state to the lean state, the widths of the shifts become greater than that of an ordinary state. Therefore, the air fuel ratio of the mixture supplied to the combustion chambers 4 shifts to the lean state, so that fuel tends to be in shortage. As a result, the concentration of oxygen in the exhaust gas exhausted from the combustion chamber 4 is increased, so that an area around the second exhaust sensor 13 assumes an oxygen surplus state by oxygen which is too much to store in the catalyst converter 11. Thus, in the oxygen surplus state, absorbing or associating of oxygen at the second exhaust sensor 13 is smoothly performed, so that the concentration of oxygen is detected with high sensitivity.

Moreover, since widths of the shifts of the feed back correction value $C_{FB}$ become greater, the concentration of oxygen around the second exhaust sensor 13 tends to shift, so that the deterioration of the catalyst during an initial period which performance of oxygen storage is high is detected with high accuracy.

Figure 8:
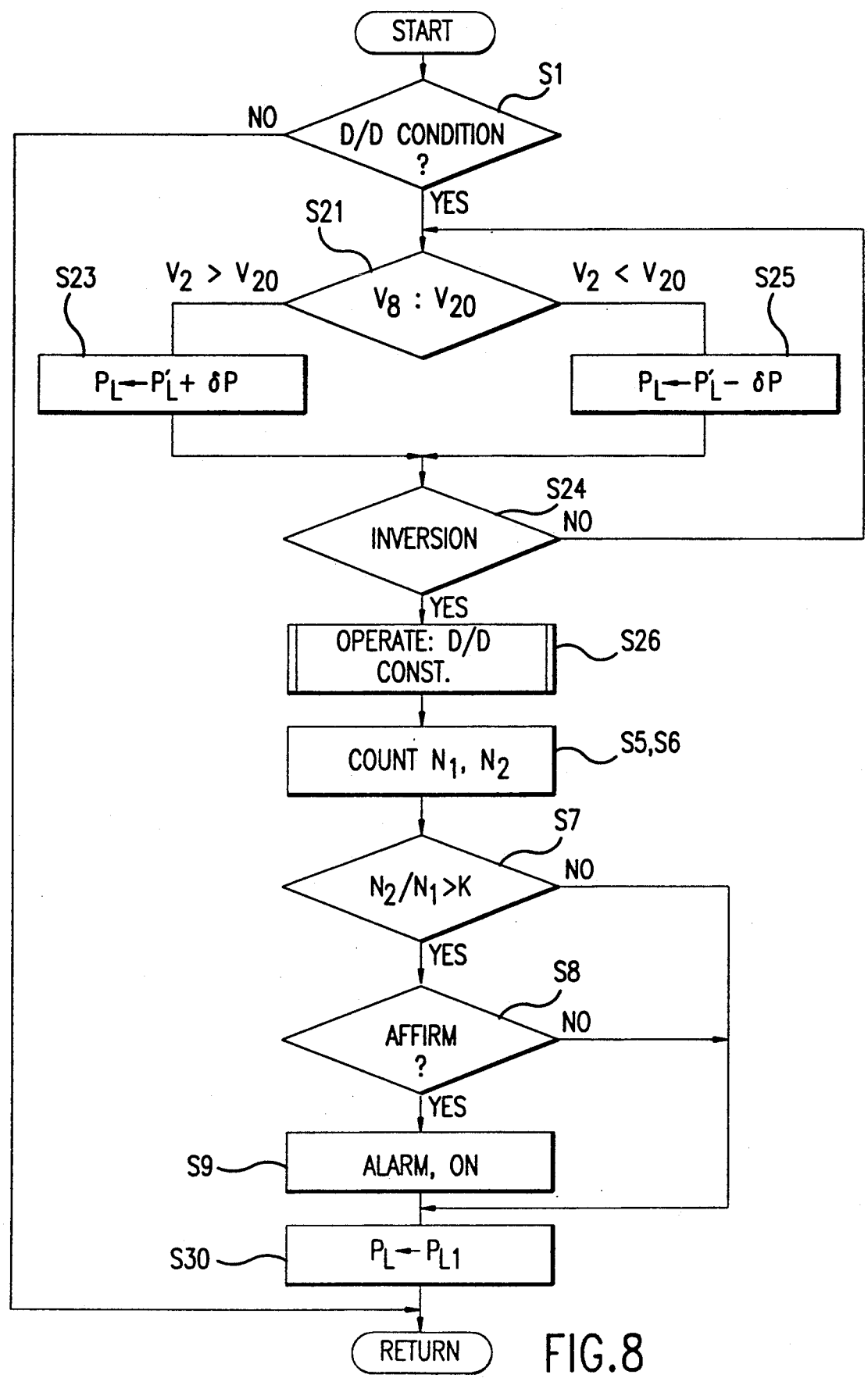
FIG. 8 is a flow chart showing a process for detection of deterioration of the catalyst according to yet another embodiment of the present invention.

Referring to FIG. 8, yet another process of detection of catalyst deterioration is shown as a flow chart. This process is similar to the process shown in FIG. 3, so that only differences will be explained for the sake of simplicity.

If the catalyst deterioration detect condition is complete at step 1, going to a step S21, the ECU 14 compares the output voltage $V_2$ of the second exhaust sensor 13 with a predetermined standard voltage $V_{20}$. If a rich state in which the output voltage $V_2$ is greater than the standard voltage $V_{20}$ is judged, going to a step S23, the ECU 14 sets a value, in which only predetermined value $\delta P$ is added to the value $P'_L$ of the latest time of the lean skip value, to a value $P_L$ of the present time, and, at a step S24, whether the output voltage $V_2$ of the second exhaust sensor 13 is inverted or not is judged. If a lean state in which the output voltage $V_2$ is less than the standard voltage $V_{20}$ is judged, going to a step S25, the ECU 14 sets a value, in which only predetermined value $\delta P$ is reduced from the value $P'_L$ of the latest time of the lean skip value, to a value $P_L$ of the present time, and, at a step S24, in the same manner, whether the output voltage $V_2$ of the second exhaust sensor 13 is inverted or not is judged. Briefly, the feed back control constant is changed so that the output voltage $V_2$ of the second exhaust sensor 13 is inverted.

Figure 9:
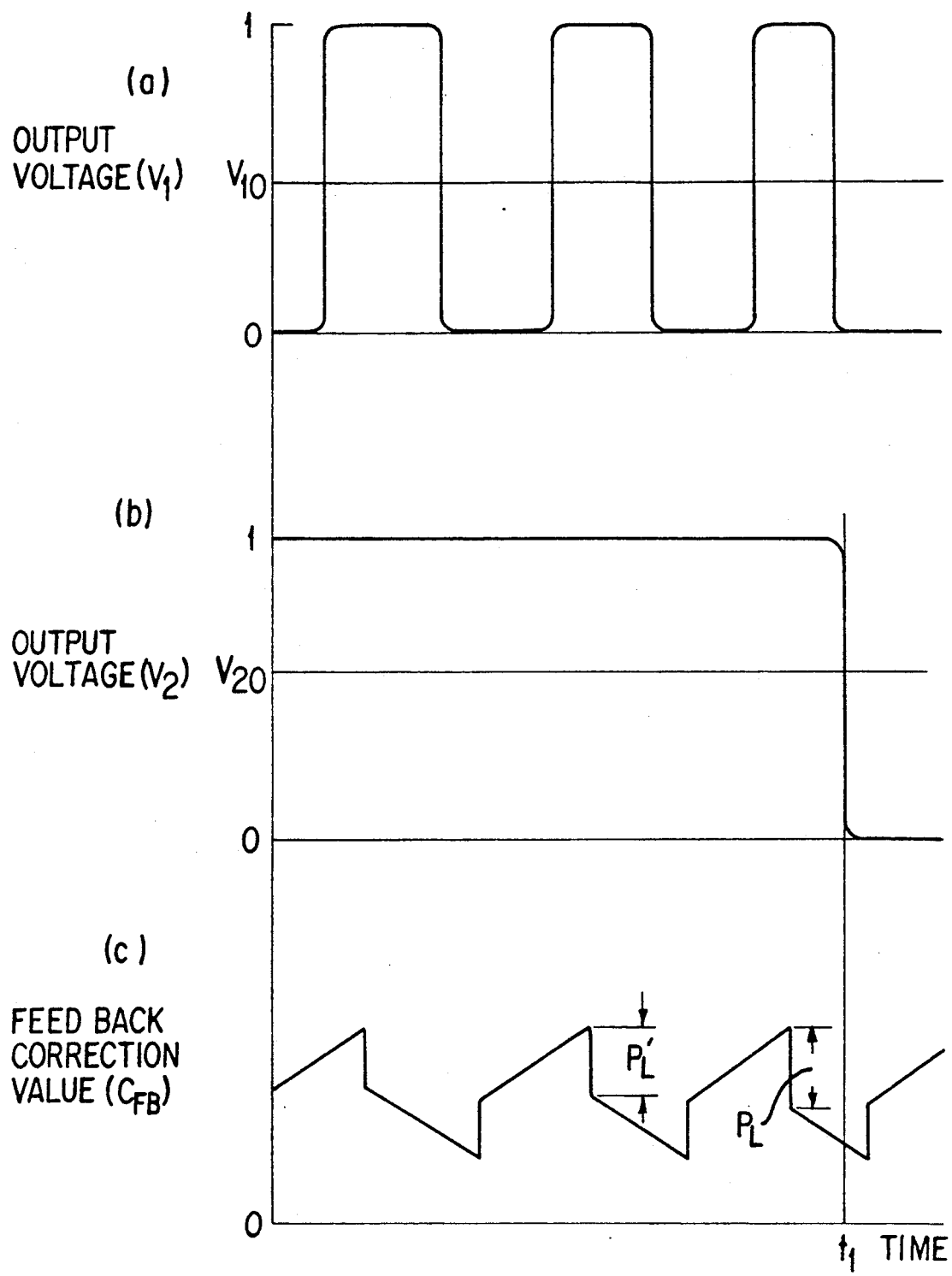
FIG. 9 is a flow chart showing change of a feed back collection value during a calculation process of control constant of feed back for detecting deterioration of the catalyst according to yet another embodiment of the present invention.

If the ECU judges at the step S24 that the output voltage $V_2$ of the second exhaust sensor 13 is inverted, going to a step S26, the ECU operates the lean skip value $P_{L2}$ for deterioration judgement of the catalyst using the feed back control constant of the timing that the inversion is occurred. Namely, for example, as shown in FIG. 9(b), while it is the rich state that the output voltage $V_2$ of the second exhaust sensor is higher than the standard voltage $V_{20}$, the lean skip value is changed to a value $P_L$ ($P_L - P'_L = \delta P$) of the present time by adding the value $P'_L$ of the latest time, as shown in FIG. 9(c). In that case, at a timing $t_1$, as shown in FIG. 9(b), supposing that the output voltage $V_{20}$ of the second exhaust sensor 13 has indicated a lower value than the standard voltage $V_{20}$ and it becomes an inverted state, and if the feed back control of the air fuel ratio is performed by using the lean skip value $P_L$ at the time, the output voltage $V_2$ of the second exhaust sensor 13 is indicated a lower value than the standard voltage $V_{20}$, it is impossible to judge the deterioration of the catalyst converter. Therefore, a value wherein a predetermined value $P_c$ is subtracted from the lean skip value $P_L$ of the timing that the output voltage $V_2$ is inverted is set as a lean skip value $P_{L2}$ ($P_{L2} = P_L - P_c$) for the deterioration judgement of the catalyst Briefly, a value near to a lean skip value of a timing right before that the output voltage $V_2$ is inverted is set as the lean skip value $P_{L2}$ for judging the catalyst deterioration. Of course, if the step S25 is executed, when the output voltage $V_2$ of the second exhaust sensor is shifted from a low state, which is lower than the standard voltage $V_{20}$, to a high state, a value added a predetermined value $P_c$ to a lean skip value $P_{L2}$ for judgement of the catalyst deterioration at the time is set as a lean skip value $P_{L2}$ for judgement of the catalyst deterioration.

Figure 10:
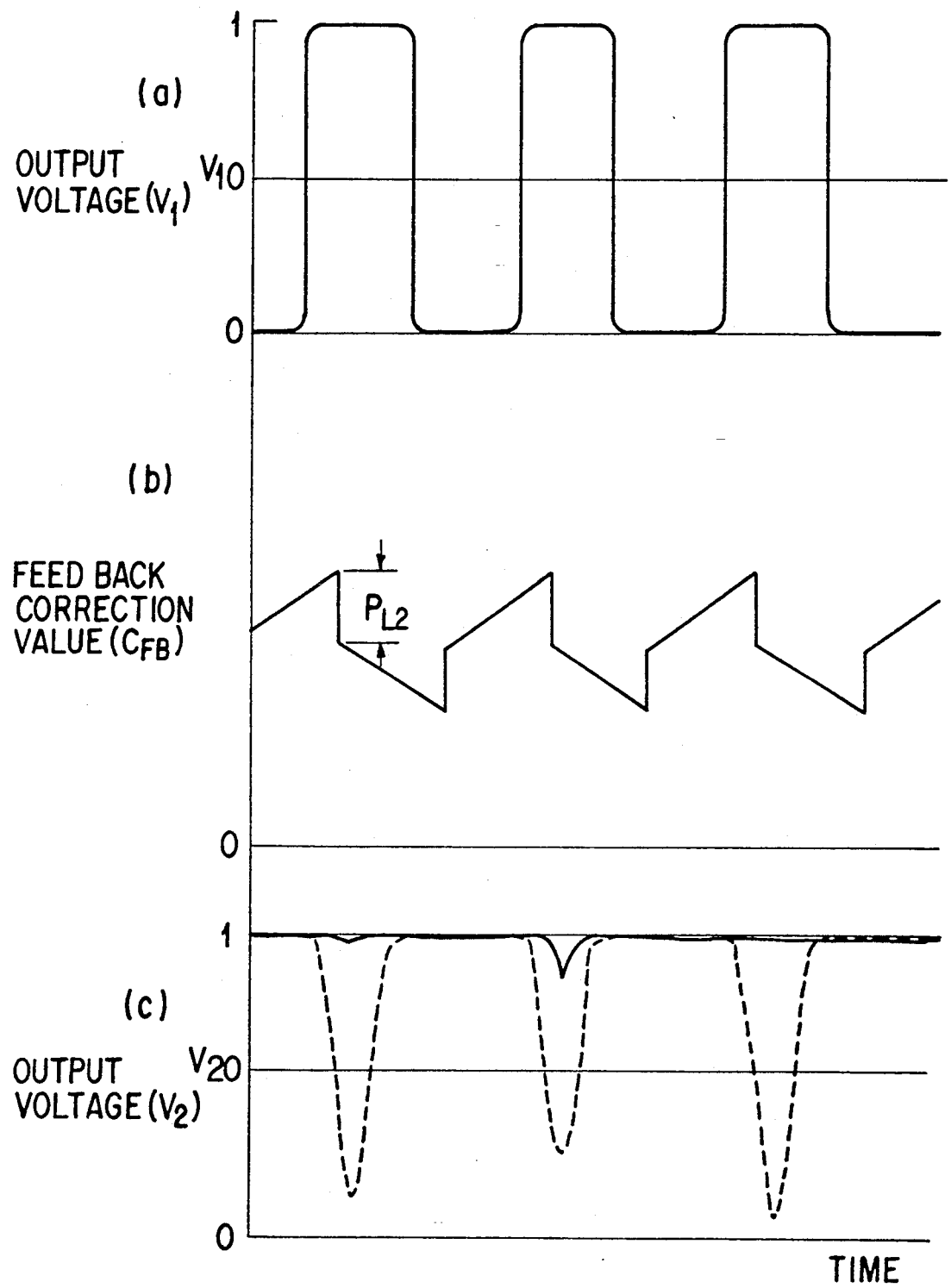
FIG. 10 is a time chart showing change of a feed back collection value during a detection of deterioration of the catalyst according to yet another embodiment of the present invention.

Referring to FIG. 10, the operation of this embodiment will be explained.

Namely, during judging of the catalyst deterioration, as shown in FIG. 10(b), an air fuel ratio control is performed by the lean skip value $P_{L2}$ which is near to a value that the output voltage $V_2$ of the second exhaust sensor 13 is inverted. In this case, during a period that the catalyst is active, the output voltage $V_2$ of the second exhaust sensor 13 tends to shift to a rich side, and therefore, the proportion of the second inverting number $N_2$ against the first inverting number $N_1$ is never greater than the standard value K for judgement of deterioration, so that the judgement that the catalyst is in a deteriorated state is never performed.

On the contrary, as shown in a broken line of FIG. 10 (c), if a frequency that the output voltage $V_2$ of the second exhaust sensor 13 tends to invert to the lean side exceeding the standard voltage $V_{20}$ becomes large, and that the proportion of the second inverting number $N_2$ against the first inverting number $N_1$ is greater than the predetermined standard value K deterioration judgement tends to occur frequently. Therefore, if the deterioration of the catalyst is conclusively judged, the alarm 20 is turned on, and an extraordinary state is informed to the driver.

Moreover, it is to be noted that although the control constant for judging the catalyst deterioration is calculated by changing skip value, other skip value, integral constants, and delay constants, or all of these may be changed.

It is finally understood that although the present invention has been described in detail with respect to preferred embodiments thereof, various other embodiments and variations may occur to those skilled in the art which fall within the scope and the spirit of the invention. Such other embodiments and variations are intended to be covered by the following claims.

What is claimed is:

1. An exhaust purification apparatus for an engine comprising:
   a catalytic converter located in an exhaust system of the engine for purifying exhaust gas from the engine;
   first exhaust sensor means for detecting concentration of remaining oxygen in the exhaust gas and provided in the exhaust system on an upstream side of said catalytic converter;
   second exhaust sensor means for detecting concentration of remaining oxygen in said exhaust gas and provided in the exhaust system on a downstream side of said catalytic converter;
   feed back control means for controlling an air fuel ratio of said engine in response to a detected value of said first exhaust sensor means and a predetermined control constant;
   operating condition detecting means for detecting a predetermined operating state of the engine suitable for judging deterioration of a catalyst in said catalytic converter;
   deterioration judging means for judging deterioration of a catalyst in said catalytic converter on the basis of a detected value of said second sensor means when said operating condition detecting means detects said predetermined operating state of said engine; and
   control constant changing means for changing a control constant of said air fuel ratio of said feed back control means from the predetermined control constant when the deterioration judging means judges deterioration of said catalyst.

2. An exhaust purification apparatus according to claim 1, further comprising learning correction means for correcting said control constant of said control constant changing means during a normal operating state so that an exhaust condition in an area around said second exhaust sensor means is adjusted to a balanced condition on the basis of said concentration detected by said second exhaust sensor means, and wherein said control constant changing means changes said control constant when deterioration is judged by said deterioration judging means so that partial pressure of oxygen in an area around said second exhaust sensor means is shifted to one of an oxygen surplus side and an oxygen shortage side on the basis of the corrected control constant from said learning correction means.

3. An exhaust purification apparatus according to claim 1, further comprising learning correction means for correcting said control constant of said control constant changing means during an ordinary state so that said concentration detected by said second exhaust sensor means alternately repeats equally an oxygen surplus state and an oxygen shortage state on the basis of said concentration detected by said second exhaust sensor means, and wherein said control constant changing means has means for changing said control constant when deterioration is judged by said deterioration judging means so that partial pressure of oxygen in an area around said second exhaust sensor means is shifted to one of an oxygen surplus side and an oxygen shortage side on the basis of the control constant corrected by said learning correction means.

4. An exhaust purification apparatus according to claim 1, wherein said control constant changing means has means for changing said control constant when deterioration is judged by said deterioration judging means so that partial pressure of oxygen in an area around said second exhaust sensor means is shifted to one of an oxygen surplus side and an oxygen shortage side relative to a value during a normal operating state.

5. An exhaust purification apparatus according to claim 1, wherein said control constant changing means has means for changing said control constant when deterioration is judged by said deterioration judging means so that partial pressure of oxygen in an area around said second exhaust sensor means is shifted to an oxygen surplus side relative to a value during a normal operating state.

6. An exhaust purification apparatus according to claim 1, wherein said control constant changing means has means for changing said control constant to a greater value than that during a normal operating state when deterioration is by said deterioration judging means so that said detected value of said second exhaust sensor means tends to shift.

7. An exhaust purification apparatus according to claim 6, further comprising used time related information detecting means for detecting used time related information, which indicates a change corresponding to used time of said catalyst, and control constant correction means for correction said control constant changed by said control constant changing means to a lesser value as said used time related information is increased.

8. An exhaust purification apparatus according to claim 7, further comprising sensor deterioration detecting means for detecting deterioration of said second exhaust sensor means, and correction limiting means for limiting correction of said control constant by said control constant correcting means when deterioration of said second exhaust sensor means is detected by said sensor deterioration detecting means.

9. An exhaust purification apparatus according to claim 1, wherein said control constant changing means has means for changing said control constant to that of a time immediately before a detected value of said second exhaust sensor means is inverted.

* * * * *

UNITED STATES PATENT AND TRADEMARK OFFICE
CERTIFICATE OF CORRECTION

PATENT NO. : 5,311,737
DATED : May 17, 1994
INVENTOR(S) : KAZUNARI et al.

It is certified that error appears in the above-indentified patent and that said Letters Patent is hereby corrected as shown below:

TITLE PAGE

Application No.:

"959,762", should read --859,762--

Foreign Application Priority Data:

"Mar. 29, 1991 [JP]    Japan................ 3-0933518", should read:

--Mar. 29, 1991 [JP]    Japan................ 3-093518--

Signed and Sealed this

Thirteenth Day of September, 1994

Attest:

BRUCE LEHMAN

Attesting Officer    Commissioner of Patents and Trademarks